(12) United States Patent
Mavani et al.

(10) Patent No.: US 11,062,483 B1
(45) Date of Patent: Jul. 13, 2021

(54) SYSTEM FOR DYNAMIC TRANSFORMATION OF ELECTRONIC REPRESENTATION OF RESOURCES

(71) Applicant: Bank of America Corporation, Charlotte, NC (US)

(72) Inventors: Saurabh Mavani, Lake Hopatcong, NJ (US); Francis Schommer, Plano, TX (US); Martha Sain McClellan, Lancaster, SC (US); Oscar Guzman, Dallas, TX (US); Lisa Janette Ebba Weekes, Waxhaw, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 16/743,263

(22) Filed: Jan. 15, 2020

(51) Int. Cl.
*G06T 19/00* (2011.01)
*G06T 11/00* (2006.01)
*G06Q 50/26* (2012.01)

(52) U.S. Cl.
CPC .............. *G06T 11/00* (2013.01); *G06Q 50/26* (2013.01); *G06T 2200/24* (2013.01)

(58) Field of Classification Search
CPC .............................. G06T 19/006; G06T 11/00
See application file for complete search history.

(56) References Cited

U.S. PATENT DOCUMENTS

| 6,073,115 | A | 6/2000 | Marshall |
| 3,478,674 | A1 | 7/2013 | Kapczynski et al. |
| 9,164,281 | B2 | 10/2015 | Hing et al. |
| 9,183,560 | B2 | 11/2015 | Abelow |
| 9,251,333 | B2 | 2/2016 | Chatterton et al. |
| 9,251,715 | B2 | 2/2016 | Hing et al. |
| 9,311,741 | B2 | 4/2016 | Rogers et al. |
| 9,378,644 | B2 | 6/2016 | Ng-Thow-Hing et al. |
| 9,393,870 | B2 | 7/2016 | Ng-Thow-Hing et al. |
| 9,418,378 | B2 | 8/2016 | Staicut et al. |
| 9,569,757 | B1 | 2/2017 | Wilson et al. |
| 9,639,174 | B2 | 5/2017 | Schulz et al. |
| 9,652,894 | B1 | 5/2017 | Weekly et al. |
| 9,747,898 | B2 | 8/2017 | Ng-Thow-Hing et al. |
| 9,842,330 | B1 | 12/2017 | Van Os et al. |
| 9,928,547 | B2 | 3/2018 | Del Vecchio et al. |

(Continued)

*Primary Examiner* — Yi Yang
(74) *Attorney, Agent, or Firm* — Michael A. Springs; Moore & Van Allen PLLC; Anup Shrinivasan Iyer

(57) ABSTRACT

Systems, computer program products, and methods are described herein for dynamic transformation of electronic representation of resources. The present invention is configured to electronically receive a request from a user to access one or more resources; electronically receive information associated with the one or more resources associated with the user from a resource database; generate an electronic representation of the one or more resources; transmit control signals configured to cause the application stored on the computing device associated with the user to display the electronic representation of the one or more resources; electronically receive one or more input signals from the user, via the application, to interact with the electronic representation of the one or more resources; and initiate an execution of one or more actions on the electronic representation of the one or more resources in response to the one or more input signals from the user.

20 Claims, 2 Drawing Sheets

(56) References Cited

U.S. PATENT DOCUMENTS

| | | |
|---|---|---|
| 10,037,082 B2 | 7/2018 | Schulz et al. |
| 10,055,891 B2 | 8/2018 | Jones-McFadden et al. |
| 10,121,136 B2 | 11/2018 | Mock et al. |
| 10,339,711 B2 | 7/2019 | Ng-Thow-Hing et al. |
| 10,438,205 B2 | 10/2019 | Van Os et al. |
| 10,496,978 B2 | 12/2019 | Runyan |
| 10,534,434 B2 | 1/2020 | Yoo et al. |
| 10,621,581 B2 | 4/2020 | Van Os et al. |
| 2002/0178096 A1 | 11/2002 | Marshall |
| 2011/0246276 A1* | 10/2011 | Peters ............... G06Q 30/0223 705/14.24 |
| 2016/0182971 A1* | 6/2016 | Ortiz ............... H04N 21/42224 725/34 |
| 2016/0358181 A1 | 12/2016 | Bradski |
| 2018/0324186 A1* | 11/2018 | Dintenfass ............. H04L 63/04 |
| 2019/0244554 A1* | 8/2019 | Tokuchi ............. G06F 3/04842 |

* cited by examiner

SYSTEM FOR DYNAMIC TRANSFORMATION OF ELECTRONIC REPRESENTATION OF RESOURCES

FIELD OF THE INVENTION

The present invention embraces a system for dynamic transformation of electronic representation of resources.

BACKGROUND

Advancements in technology have made mobile devices with multi-faceted functionality ubiquitous. These developments have facilitated numerous methods for dynamic resource transfer, utilization, and transformation. Dynamic resource transformation requires the ability to purposefully adapt to the ever changing requirements within the technological environment. Resources that are electronically represented within such environments may often require real-time or near real-time transformation based on the changing requirements.

There is a need for a system for dynamic transformation of electronic representation of resources.

SUMMARY

The following presents a simplified summary of one or more embodiments of the present invention, in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for dynamic transformation of electronic representation of resources is presented. The system comprising: at least one non-transitory storage device; and at least one processing device coupled to the at least one non-transitory storage device, wherein the at least one processing device is configured to: electronically receive, via an application stored on a computing device of a user, a request from a user to access one or more resources, wherein the one or more resources are associated with the user; electronically receive information associated with the one or more resources associated with the user from a resource database; generate an electronic representation of the one or more resources; transmit control signals configured to cause the application stored on the computing device associated with the user to display the electronic representation of the one or more resources; electronically receive one or more input signals from the user, via the application, to interact with the electronic representation of the one or more resources; and initiate an execution of one or more actions on the electronic representation of the one or more resources in response to the one or more input signals from the user.

In some embodiments, the at least one processing device is further configured to: electronically receive the one or more input signals from the user, wherein the one or more input signals comprises a request to initiate a computer-generated perceptual display of the electronic representation of the one or more resources; and initiate an augmented reality engine configured to cause the application to superimpose the electronic representation of the one or more resources onto one or more real-world objects.

In some embodiments, the augmented reality engine is further configured to: initiate an image capturing device associated with the computing device of the user; retrieve, via the image capturing device, the one or more real-world objects; and superimpose the electronic representation of the one or more resources onto the one or more real-world objects.

In some embodiments, the at least one processing device is further configured to: electronically receive, from the computing device of the user, control signals configured to initiate a transfer of the one or more resources to a first entity; generate one or more graphical components of the electronic representation of the one or more resources based on at least receiving the control signals configured to initiate the transfer of the one or more resources; and transmit control signals configured to cause the computing device of the user to display the one or more graphical components of the electronic representation of the one or more resources.

In some embodiments, the at least one processing device is further configured to: electronically receive at least one of the one or more input signals from the user, via the application, to interact with at least a portion of the one or more graphical components of the electronic representation of the one or more resources; and initiate the transfer of at least the portion of the one or more graphical components of the electronic representation of the one or more resources to the first entity in response to the at least one of the one or more input signals from the user, wherein initiating further comprises initiating the transfer of the one or more resources to the first entity.

In some embodiments, the at least one processing device is further configured to: generate a virtual representation of the resource database and a virtual representation of the first entity in a virtual representation of a technology environment; transmit control signals configured to cause the computing device of the user to display the virtual representation of the resource database and the virtual representation of the first entity within the technology environment; electronically receive the at least one of the one or more input signals from the user, via the application, to interact with at least the portion of the one or more graphical components of the electronic representation of the one or more resources; and initiate the transfer of at least the portion of the one or more graphical components of the electronic representation of the one or more resources from the virtual representation of the resource database to the virtual representation of the first entity within the virtual representation of the technology environment, wherein initiating further comprises initiating the transfer of the one or more resources to the first entity.

In some embodiments, the at least one processing device is further configured to: initiate the transfer of at least the portion of the one or more graphical components of the electronic representation of the one or more resources to the first entity based on at least one of the one or more input signals from the user in real-time or near real-time.

In some embodiments, the at least one processing device is further configured to: execute the transfer of the one or more resources from the resource database to the first entity based on at least transferring at least the portion of the one or more graphical components of the electronic representation of the one or more resources to the first entity in real-time or near-real time.

In another aspect, a computerized implemented method for dynamic transformation of electronic representation of resources is presented. The method comprising: electronically receiving, via an application stored on a computing device of a user, a request from a user to access one or more resources, wherein the one or more resources are associated with the user; electronically receiving information associated with the one or more resources associated with the user from a resource database; generating an electronic representation of the one or more resources; transmitting control signals configured to cause the application stored on the computing device associated with the user to display the electronic representation of the one or more resources; electronically receiving one or more input signals from the user, via the application, to interact with the electronic representation of the one or more resources; and initiating an execution of one or more actions on the electronic representation of the one or more resources in response to the one or more input signals from the user.

In another aspect, a computer program product for dynamic transformation of electronic representation of resources is presented. The computer program product comprising a non-transitory computer-readable medium comprising code causing a first apparatus to: electronically receive, via an application stored on a computing device of a user, a request from a user to access one or more resources, wherein the one or more resources are associated with the user; electronically receive information associated with the one or more resources associated with the user from a resource database; generate an electronic representation of the one or more resources; transmit control signals configured to cause the application stored on the computing device associated with the user to display the electronic representation of the one or more resources; electronically receive one or more input signals from the user, via the application, to interact with the electronic representation of the one or more resources; and initiate an execution of one or more actions on the electronic representation of the one or more resources in response to the one or more input signals from the user.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
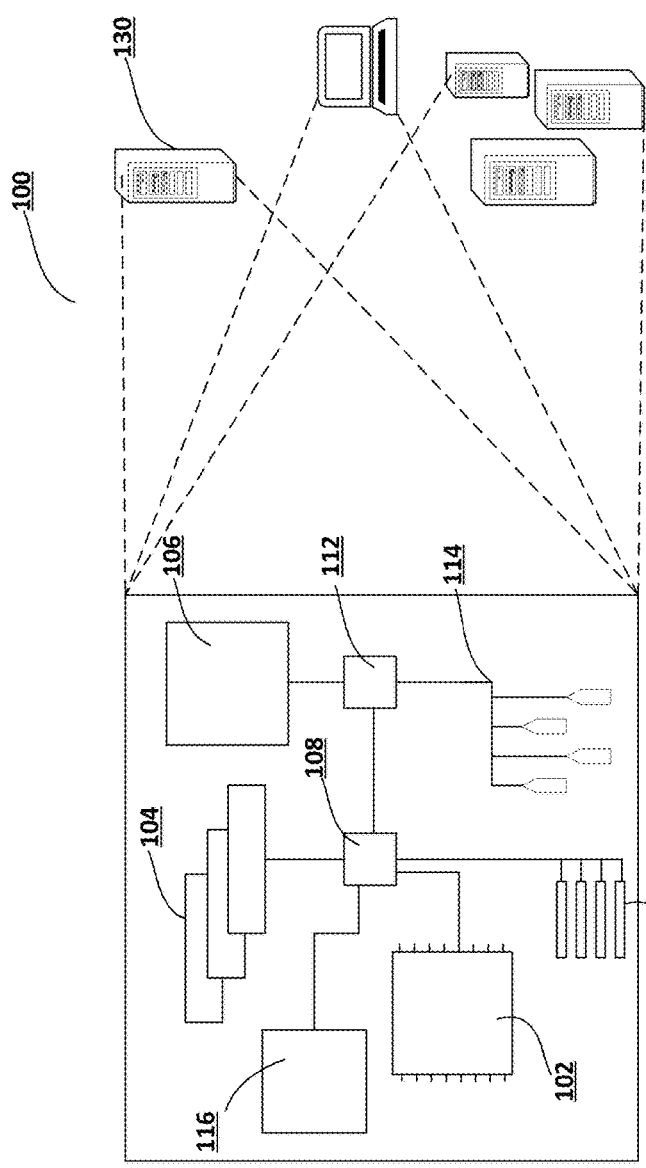
Figure 1:
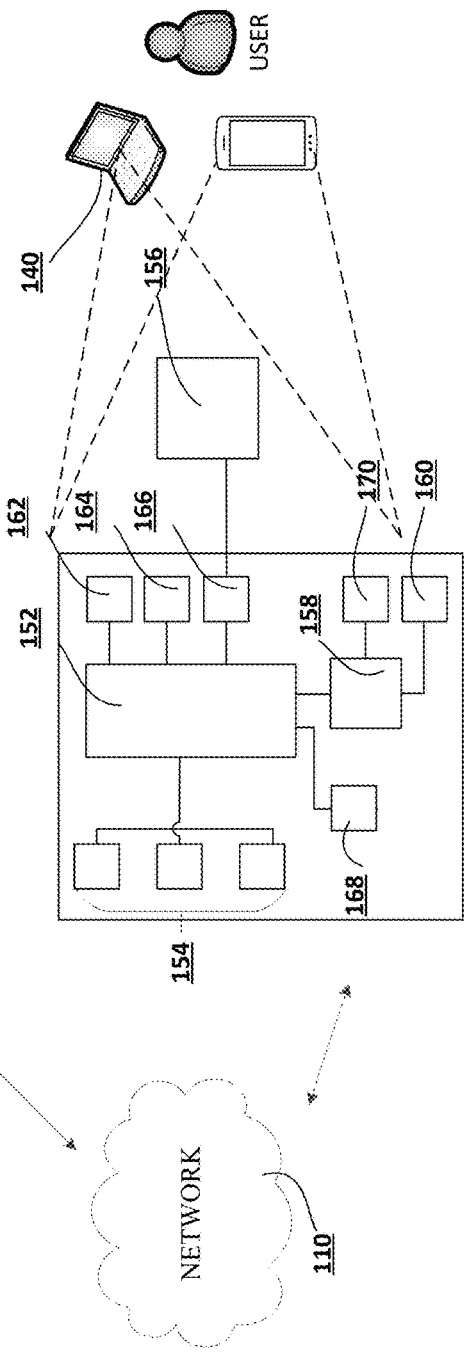
Figure 2:
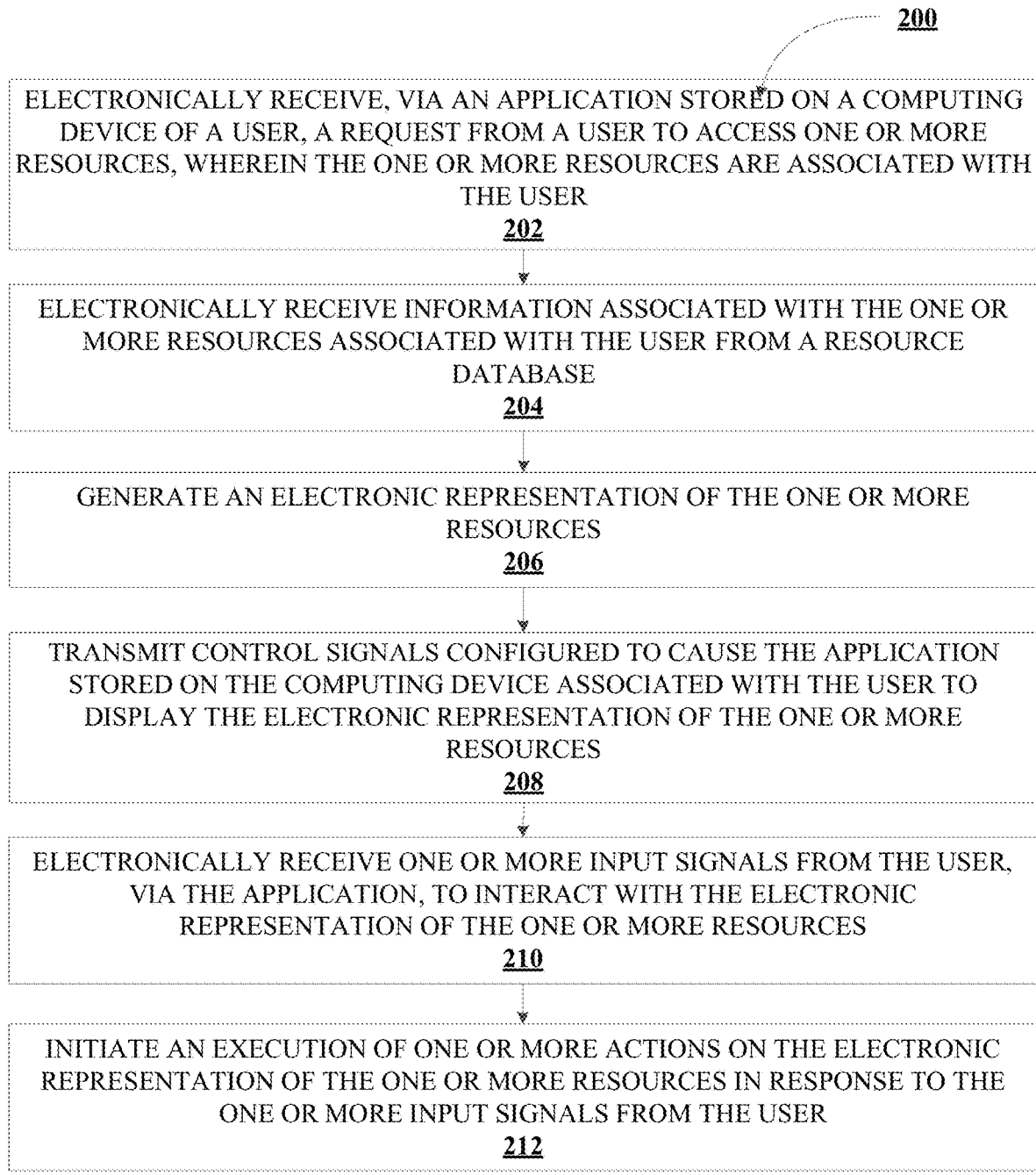

Having thus described embodiments of the invention in general terms, reference will now be made the accompanying drawings, wherein:

FIG. 1 illustrates technical components of a system for dynamic transformation of electronic representation of resources, in accordance with an embodiment of the invention; and FIG. 2 illustrates a process flow for dynamic transformation of electronic representation of resources, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, a "user" may be an employee (e.g., an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer or a prospective customer. In other embodiments, a user may be a system performing one or more tasks described herein.

As used herein, a "user interface" may be any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of a computer program, or part of a computer program that serves as a foundation for a larger piece of software and drives the functionality of the software. An engine may be self-contained, but externally-controllable code that encapsulates powerful logic designed to perform or execute a specific type of function. In one aspect, an engine may be underlying source code that establishes file hierarchy, input and output methods, and how a specific part of a computer program interacts or communicates with other software and/or hardware. The specific components of an engine may vary based on the needs of the specific computer program as part of the larger piece of software. In some embodiments, an engine may be configured to retrieve assets created in other computer programs, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, a "resource" may generally refer to objects, products, devices, goods, commodities, services, and the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, or the like.

As used herein, a "resource transfer" may refer to any transaction, activities or communication between one or more entities, or between the user and the one or more entities. A resource transfer may refer to any distribution of resources such as, but not limited to, a payment, processing of funds, purchase of goods or services, a return of goods or services, a payment transaction, a credit transaction, or other interactions involving a user's resource or account. In the context of an entity such as a financial institution, a resource transfer may refer to one or more of: a sale of goods and/or services, initiating an automated teller machine (ATM) or online banking session, an account balance inquiry, a rewards transfer, an account money transfer or withdrawal, opening a bank application on a user's computer or mobile device, a user accessing their e-wallet, or any other interaction involving the user and/or the user's device that invokes or is detectable by the financial institution. In some embodiments, the user may authorize a resource transfer using at least a payment instrument (credit cards, debit cards, checks, digital wallets, currency, loyalty points), and/or payment credentials (account numbers, payment instrument identifiers). A resource transfer may include one or more of the following: renting, selling, and/or leasing goods and/or services (e.g., groceries, stamps, tickets, DVDs, vending machine items, and the like); making payments to creditors (e.g., paying monthly bills; paying federal, state, and/or local taxes; and the like); sending remittances; loading money onto stored value cards (SVCs) and/or prepaid cards; donating to charities; and/or the like. Unless specifically limited by the context, a "resource transfer" a "transaction", "transaction event" or "point of transaction event" may refer to any activity between a user, a merchant, an entity, or any combination thereof. In some embodiments, a resource transfer or transaction may refer to financial transactions involving direct or indirect movement of funds through traditional paper transaction processing systems (i.e. paper check processing) or through electronic transaction processing systems. In this regard, resource transfers or transactions may refer to the user initiating a purchase for a product, service, or the like from a merchant. Typical financial transactions include point of sale (POS) transactions, automated teller machine (ATM) transactions, person-to-person (P2P) transfers, internet transactions, online shopping, electronic funds transfers between accounts, transactions with a financial institution teller, personal checks, conducting purchases using loyalty/rewards points etc. When discussing that resource transfers or transactions are evaluated it could mean that the transaction has already occurred, is in the process of occurring or being processed, or it has yet to be processed/posted by one or more financial institutions. In some embodiments, a resource transfer or transaction may refer to non-financial activities of the user. In this regard, the transaction may be a customer account event, such as but not limited to the customer changing a password, ordering new checks, adding new accounts, opening new accounts, adding or modifying account parameters/restrictions, modifying a payee list associated with one or more accounts, setting up automatic payments, performing/modifying authentication procedures and/or credentials, and the like.

As used herein, "authentication credentials" may be any information that can be used to confirm the identity of a user. For example, a system may prompt a user to enter authentication information such as a username, a password, a personal identification number (PIN), a passcode, biometric information (e.g., voice authentication, a fingerprint, and/or a retina scan), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

As used herein, an "electronic representation" may refer to a characterization of a resource level/value of the one or more resources in one or more computer generated digital graphic formats using one or more computer algorithms. The digital graphic formats may be static or dynamic, two-dimensional or three-dimensional, and/or any combination thereof. In one aspect, electronic representation may involve implementation of windowing systems, applications, architectures, and frameworks capable of executing interaction design, navigation design, and screen design of the electronic representation of the information.

As used herein, a "virtual representation" may refer to electronic transformation of information by applying game-design elements and integrating basic actions, processes, visuals, and control mechanisms that are used to "gamify" executable actions on the objects and create an engaging experience. In this regard, virtual representation of information may involve designing interactive digital products, environments, systems, and services to enable seamless user participation and engagement with the virtual representation of the information. In some embodiments, virtual representation may refer to computer generated imagery and/or animations created with computer algorithms representing real-world objects and/or digital objects. Similar to electronic representations, virtual representations may be dynamic or static, multi-dimensional, and capable of digitally synthesizing and manipulating visual content.

As used herein, an "interaction" may refer to any communication between one or more users, one or more entities or institutions, and/or one or more devices, nodes, clusters, or systems within the system environment described herein.

For example, an interaction may refer to a transfer of data between devices, an accessing of stored data by one or more nodes of a computing cluster, a transmission of a requested task, or the like.

FIG. 1 presents an exemplary block diagram of the system environment for dynamic transformation of electronic representation of resources 100, in accordance with an embodiment of the invention. FIG. 1 provides a unique system that includes specialized servers and system communicably linked across a distributive network of nodes required to perform the functions of the process flows described herein in accordance with embodiments of the present invention.

As illustrated, the system environment 100 includes a network 110, a system 130, and a user input system 140. Also shown in FIG. 1 is a user of the user input system 140. The user input system 140 may be a mobile device or other non-mobile computing device. The user may be a person who uses the user input system 140 to execute resource transfers using one or more applications stored thereon. The one or more applications may be configured to communicate with the system 130, execute a transaction, input information onto a user interface presented on the user input system 140, or the like. The applications stored on the user input system 140 and the system 130 may incorporate one or more parts of any process flow described herein.

As shown in FIG. 1, the system 130, and the user input system 140 are each operatively and selectively connected to the network 110, which may include one or more separate networks. In addition, the network 110 may include a telecommunication network, local area network (LAN), a wide area network (WAN), and/or a global area network (GAN), such as the Internet. It will also be understood that the network 110 may be secure and/or unsecure and may also include wireless and/or wired and/or optical interconnection technology.

In some embodiments, the system 130 and the user input system 140 may be used to implement the processes described herein, including the mobile-side and server-side processes for installing a computer program from a mobile device to a computer, in accordance with an embodiment of the present invention. The system 130 is intended to represent various forms of digital computers, such as laptops, desktops, workstations, personal digital assistants, servers, blade servers, mainframes, and other appropriate computers. The user input system 140 is intended to represent various forms of mobile devices, such as personal digital assistants, cellular telephones, smartphones, virtual reality devices, and other similar computing devices. The components shown here, their connections and relationships, and their functions, are meant to be exemplary only, and are not meant to limit implementations of the inventions described and/or claimed in this document.

In accordance with some embodiments, the system 130 may include a processor 102, memory 104, a storage device 106, a high-speed interface 108 connecting to memory 104, and a low-speed interface 112 connecting to low speed bus 114 and storage device 106. Each of the components 102, 104, 106, 108, 111, and 112 are interconnected using various buses, and may be mounted on a common motherboard or in other manners as appropriate. The processor 102 can process instructions for execution within the system 130, including instructions stored in the memory 104 or on the storage device 106 to display graphical information for a GUI on an external input/output device, such as display 116 coupled to a high-speed interface 108. In other implementations, multiple processors and/or multiple buses may be used, as appropriate, along with multiple memories and types of memory. Also, multiple systems, same or similar to system 130 may be connected, with each system providing portions of the necessary operations (e.g., as a server bank, a group of blade servers, or a multi-processor system). In some embodiments, the system 130 may be a server managed by the business. The system 130 may be located at the facility associated with the business or remotely from the facility associated with the business.

The memory 104 stores information within the system 130. In one implementation, the memory 104 is a volatile memory unit or units, such as volatile random access memory (RAM) having a cache area for the temporary storage of information. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like. The memory 104 may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

In some embodiments, the system 130 may be configured to access, via the 110, a number of other computing devices (not shown). In this regard, the system 130 may be configured to access one or more storage devices and/or one or more memory devices associated with each of the other computing devices. In this way, the system 130 may implement dynamic allocation and de-allocation of local memory resources among multiple computing devices in a parallel or distributed system. Given a group of computing devices and a collection of interconnected local memory devices, the fragmentation of memory resources is rendered irrelevant by configuring the system 130 to dynamically allocate memory based on availability of memory either locally, or in any of the other computing devices accessible via the network. In effect, it appears as though the memory is being allocated from a central pool of memory, even though the space is distributed throughout the system. This method of dynamically allocating memory provides increased flexibility when the data size changes during the lifetime of an application, and allows memory reuse for better utilization of the memory resources when the data sizes are large.

The high-speed interface 1408 manages bandwidth-intensive operations for the system 130, while the low speed controller 112 manages lower bandwidth-intensive operations. Such allocation of functions is exemplary only. In some embodiments, the high-speed interface 108 is coupled to memory 104, display 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms, as shown in FIG. 1. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 140 may be made up of multiple computing devices communicating with each other.

FIG. 1 also illustrates a user input system 140, in accordance with an embodiment of the invention. The user input system 140 includes a processor 152, memory 154, an input/output device such as a display 156, a communication interface 158, and a transceiver 160, among other components. The user input system 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the user input system 140, including instructions stored in the memory 154. The processor may be implemented as a chipset of chips that include separate and multiple analog and digital processors. The processor may be configured to provide, for example, for coordination of the other components of the user input system 140, such as control of user interfaces, applications run by user input system 140, and wireless communication by user input system 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of user input system 140 with other devices. External interface 168 may provide, for example, for wired communication in some implementations, or for wireless communication in other implementations, and multiple interfaces may also be used.

The memory 154 stores information within the user input system 140. The memory 154 can be implemented as one or more of a computer-readable medium or media, a volatile memory unit or units, or a non-volatile memory unit or units. Expansion memory may also be provided and connected to user input system 140 through an expansion interface (not shown), which may include, for example, a SIMM (Single In Line Memory Module) card interface. Such expansion memory may provide extra storage space for user input system 140, or may also store applications or other information therein. In some embodiments, expansion memory may include instructions to carry out or supplement the processes described above, and may include secure information also. For example, expansion memory may be provided as a security module for user input system 140, and may be programmed with instructions that permit secure use of user input system 140. In addition, secure applications may be provided via the SIMM cards, along with additional information, such as placing identifying information on the SIMM card in a non-hackable manner. In some embodiments, the user may use the applications to execute processes described with respect to the process flows described herein. Specifically, the application executes the process flows described herein. It will be understood that the one or more applications stored in the system 130 and/or the user computing system 140 may interact with one another and may be configured to implement any one or more portions of the various user interfaces and/or process flow described herein.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the user input system 140 to transmit and/or receive information or commands to and from the system 130. In this regard, the system 130 may be configured to establish a communication link with the user input system 140, whereby the communication link establishes a data channel (wired or wireless) to facilitate the transfer of data between the user input system 140 and the system 130. In doing so, the system 130 may be configured to access one or more aspects of the user input system 140, such as, a GPS device, an image capturing component (e.g., camera), a microphone, a speaker, or the like.

The user input system 140 may communicate with the system 130 (and one or more other devices) wirelessly through communication interface 158, which may include digital signal processing circuitry where necessary. Communication interface 158 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 160. In addition, short-range communication may occur, such as using a Bluetooth, Wi-Fi, or other such transceiver (not shown). In addition, GPS (Global Positioning System) receiver module 170 may provide additional navigation- and location-related wireless data to user input system 140, which may be used as appropriate by applications running thereon, and in some embodiments, one or more applications operating on the system 130.

The user input system 140 may also communicate audibly using audio codec 162, which may receive spoken information from a user and convert it to usable digital information. Audio codec 162 may likewise generate audible sound for a user, such as through a speaker, e.g., in a handset of user input system 140. Such sound may include sound from voice telephone calls, may include recorded sound (e.g., voice messages, music files, etc.) and may also include sound generated by one or more applications operating on the user input system 140, and in some embodiments, one or more applications operating on the system 130.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

It will be understood that the embodiment of the system environment illustrated in FIG. 1 is exemplary and that other embodiments may vary. As another example, in some embodiments, the system 130 includes more, less, or different components. As another example, in some embodiments, some or all of the portions of the system environment 100 may be combined into a single portion. Likewise, in some embodiments, some or all of the portions of the system 130 may be separated into two or more distinct portions.

Digitization of cash has transformed the financial services landscape allowing entities (e.g., financial institutions) to drive optimization, improve core processing capabilities, and deliver differentiated experiences for their customers (e.g., account holders). However, the digitization of such financial accounts has deprived the account holders from the physical sensation of holding their money, visual perception of their account balance that is not in an intangible electronic form, and the ability to capture an image of the representation of their account balance in an aesthetically pleasing way.

With advancements in technology infrastructures and wireless communication implementation, portable multi-function devices, such as laptop computers, tablet computers, mobile phones, smart phones, wearable devices and the like are common. Typically, individuals may have a user device with them when in public. These user devices have the capability to hold large amounts of information, including personal information, resource data (information associated with user resources like banking accounts, payment instruments like credit cards and the like). In other aspects the user devices may enable access to resource data stored at other sources and databases based on requisite authorization. These devices may also be configured to enable the user to perform one or more activities, transactions or resource transfers through a proprietary software application via online banking, mobile banking, mobile wallets and the like. As such, advancements in technology have facilitated numerous new methods for resource transfer and utilization with user devices.

Some embodiments of the present invention provide the functional benefit of dynamically transforming the electronic representation of resources for a user within the technology infrastructures. In this regard, the present invention integrates technology tools such as a specialized portal capable of executing the process flows described herein within the framework of a proprietary software application and integrates a platform for presentation, tracking, configuration and allocation of the resources, in real-time or near real-time, to ensure realization of critical tasks and goals and to facilitate resource growth. Some other embodiments of the present invention provide the functional benefit of dynamically transforming the electronic representation of resources for a user in addition to and distinct from the existing technology infrastructure.

FIG. 2 illustrates a process flow for dynamic transformation of electronic representation of resources 200, in accordance with an embodiment of the invention. As shown in block 202, the process flow includes electronically receiving, via an application stored on a computing device of a user, a request from a user to access one or more resources, wherein the one or more resources are associated with the user. As described herein, one or more resources may be associated with one or more accounts that have cash or cash equivalents, commodities, and/or accounts that are funded with or contain property. In one aspect, the one or more resources may refer to an amount of funds available in a financial institution account of the user. In some embodiments, the system may be configured to require authentication credentials from the user in addition to the request to access the one or more resources. As described herein, authentication credentials may be any information that can be used to confirm the identity of a user. In one aspect, the system may be configured to receive the authentication credentials from the user when the user initiates the application on a computing device at the outset. In response the system may be configured to verify the authentication credentials received from the user. Once successfully verified, the system may be configured to allow the user to execute any actions initiated via the application. In another aspect, the system may be configured to request authentication credentials from the user in response to receiving the request from the user to access the one or more resources. In response, the system may be configured to receive the authentication credentials and authenticate the user by verifying the authentication credentials. Once successfully verified, the system may be configured to execute the request to access the one or more resources.

Next, as shown in block 204, the process flow includes electronically receiving information associated with the one or more resources associated with the user from a resource database. In some embodiments, in response to successfully verifying the identity of the user, the system may be configured to initiate a communication link with the resource database to receive information associated with the one or more resources.

Next, as shown in block 206, the process flow includes generating an electronic representation of the one or more resources. As described herein, the electronic representation of the one or more resources may refer to a characterization of a resource level/value of the one or more resources in one or more computer generated digital graphic formats using one or more computer algorithms. The digital graphic formats may be static or dynamic, two-dimensional or three-dimensional, and/or any combination thereof. In some embodiments, to ensure accurate electronic representation of the one or more resources, the system may be configured to determine a resource level/value associated with the one or more resources. In embodiments where the resources are amount of funds available in a financial institution account of the user, resource level/value may refer to an available balance, a collected balance, good funds, and usable funds in an account that can be invested, withdrawn or otherwise allocated or the worth of an account. In this regard, the system may be configured to determine a value of a base unit of a resource associated with the user. In one aspect, the base unit is a fundamental unit that is defined arbitrarily and not by any combination of other units. In embodiments where the resources are an amount of funds available in a financial institution account of the user, the base unit of the resource may be the currency unit—a monetary unit used as a standard unit of value and a unit of account. Typically, the value of such a base unit is determined based on the exchange rates, i.e., how much the base unit will buy in foreign currencies, treasury notes, foreign exchange reserves, interest rates, economic policies, and stability. By generating the electronic representation of the one or more resources based on the value of a base unit of the resource associated with the user, the overall value/level of the resources depicted by the electronic representation remains true to the actual value/level of the one or more resources. For example, assume that the amount of funds available in the financial institution account of the user is $100. The base unit of $100 is $1. By determining the value of $1, any electronic representation of the $100 generated will not exceed the overall value of $100 as determined based on the value of its corresponding base unit, $1.

Next, as shown in block 208, the process flow includes transmitting control signals configured to cause the application stored on the computing device associated with the user to display the electronic representation of the one or more resources. In some embodiments, in response to generating the electronic representation of the resources, the system may be configured to cause the computing device of the user to display, via the application, the electronic representation of the resources on an interactive platform/dashboard. In some embodiments, the interactive platform/dashboard may include one or more resource allocation tools such as an automatic resource allocation tool, a restrictive reallocation tool, an interactive resource allocation tool, visual stimulus reallocation tool, an automatic resource stabilizer tool, and/or the like. Each of these tools may control, perform allocations or initiate resource transfers from one or more user resources. In some embodiments, the system may be configured to formulate/construct the resource allocation tools based on the user's resource transfer/interaction patterns, type of user resources, user preferences, or the like. Therefore, the one or more resource allocation tools are specific to a user and may vary from one user to another. Typically, the one or more resource allocation tools are directed to optimal allocation and control of resources for budgeting user's resource transfers, completion of user's goals, resource growth and savings, appropriate investment of resources to foster growth, reduction in outflow resource transfers and the like. In one aspect, the user may use the integrated interfaces/dashboard to monitor various resources associated with multiple entities, monitor current resource levels, and track past and current resource transfers, by extracting resource data from various sources and generating a single integrated interface/platform on the computing device of the user.

In some embodiments, the system may be configured to electronically receive the one or more input signals from the user via the resource allocation tools embedded on the integrated interfaces/dashboard, wherein the one or more input signals comprises a request to initiate a computer-generated perceptual display of the electronic representation of the one or more resources. In response, the system may be configured to initiate an augmented reality engine configured to cause the application to superimpose the electronic representation of the one or more resources onto one or more real-world objects. In this regard, the augmented reality engine may be configured to initiate an image capturing device associated with the computing device of the user. Next, the augmented reality engine may be configured to retrieve, via the image capturing device, the one or more real-world objects. In response, the augmented reality engine may be configured to superimpose the electronic representation of the one or more resources onto the one or more real-world objects. In some other embodiments, the augmented reality engine may be configured to initiate an image projection device to project the electronic representation of the one or more resources onto one or more real-world objects and/or surfaces.

Next, as shown in block 210, the process flow includes electronically receiving one or more input signals from the user, via the application, to interact with the electronic representation of the one or more resources. Next, as shown in block 212, the process flow includes initiating an execution of one or more actions on the electronic representation of the one or more resources in response to the one or more input signals from the user.

In some embodiments, the one or more input signals may be associated with transforming the electronic representation of the one or more resources from one form to another. In one example, if the amount of funds available in the financial institution account of the user is $100 and the electronic representation of the $100 is collection of 5 banknotes of $20 denomination. The one or more input signals may be associated with transforming the electronic representation of $100 from a collection of 5 $20 denomination of banknotes to a collection of 100 $1 denomination of banknotes, a collection of 20 $5 denomination of banknotes, a collection of 400 ¢50 denomination of coins, a collection of 800 ¢25 denomination of coins, and/or the like, or any combination of thereof. In addition to specific denominations, the one or more input signals may be associated with transforming the electronic representation of $100 into Japanese yen. In this regard, the system may be configured to determine the currency exchange rate between U. S dollars and Japanese yen and transform the electronic representation of $100 into a specified denomination of Japanese yen. In another example, if the amount of funds available in the financial institution account of the user is $1000, the one or more input signals may be associated with transforming the electronic representation of the one or more resources to depict one or more commercial objects such as a specific brand of boots. In this regard, the system may be configured to first determine the price of a pair of boots. If the pair of boots costs $50, then the electronic representation of the $1000 may be transformed from banknotes to 50 pairs of boots. In yet another example, the one or more input signals may be associated with transforming the electronic representation of the one or more resources to depict one or more virtual objects such as console games. In this regard, the system may be configured to first determine the cost of each console game (or the top 10 console games of the year) and transform the electronic representation of the one or more resources in the form of console games.

In some embodiments, the system may be configured to track the change in the value of the resources over time and update the electronic representation of the resources accordingly. In embodiments where the resources are amount of funds available in a financial institution account of the user, the system may be configured to track the growth of the amount of funds and update the electronic representation of the amount of funds available in the financial institution account of the user in response to the growth. In one aspect, the system may be configured to determine that there has been a change in the amount of funds available in the financial institution account of the user. In response, the system may be configured to update the electronic representation of the amount of available funds accordingly. In some embodiments, the system may be configured to determine that the value of base unit (e.g., currency unit) has changed. In response, the system may be configured to update the electronic representation of the amount of funds by updating the value of the currency unit. In some embodiments, the system may be configured to predict the change in the value of the amount of funds available in the financial institution account over a predetermined period of time. In response, the system may be configured to update the electronic representation of the amount of funds accordingly.

In some embodiments, the system may be configured to electronically receive, from the computing device of the user, control signals configured to initiate a transfer of the one or more resources to a first entity. In one example, assume that the amount of funds available in the financial institution account of the user is $1000. The user may wish to transmit $100 to the financial institution account of the first entity. In response, the system may be configured to generate one or more graphical components of the electronic representation of the one or more resources based on at least receiving the control signals configured to initiate the transfer of the one or more resources. In some embodiments, the one or more graphical components may be specific partitions of the electronic representations of the one or more resources. Continuing with the previous example, the one or more graphical components of the one or more resources may be 10 $100 partitions of the electronic representation of the $1000 in the financial institution account of the user, or 2 pairs of boots worth $50 each. In response, the system may be configured to transmit control signals configured to cause the computing device of the user to display the one or more graphical components of the electronic representation of the one or more resources.

In some embodiments, the system may be configured to electronically receive at least one of the one or more input signals from the user, via the application, to interact with at least a portion of the one or more graphical components of the electronic representation of the one or more resources. In response, the system may be configured to initiate the transfer of at least the portion of the one or more graphical components of the electronic representation of the one or more resources to the first entity in response to the at least one of the one or more input signals from the user. By initiating the transfer of at least the portion of the one or more graphical components of the electronic representation of the one or more resources, the system may be configured to execute the transfer of the one or more resources to the first entity.

In some embodiments, the system may be configured to generate a virtual representation of the resource database and a virtual representation of the first entity in a virtual representation of a technology environment. Next, the system may be configured to transmit control signals configured to cause the computing device of the user to display the virtual representation of the resource database and the virtual representation of the first entity within the technology environment. In some embodiments, the system may be configured to display the virtual representation of the technology environment to the user via the application stored on the computing device of the user. In some other embodiments, the system may be configured to enable the user to interact with the virtual representation of the technology environment using a virtual reality device. In some embodiments, the virtual reality device may be a head-mounted device that provides an immersive simulated experience for the user that can be similar to or completely different from the real world. Virtual reality devices are capable of simulating a user's physical presence in a virtual environment. The user using the virtual reality device is able to look around the virtual world, move around in it, and interact with the virtual representations. In one aspect, the virtual reality device is operatively connected to one or more input devices for the users to experience the sense of immersion and defines the way the user communicates with the virtual representation of the technology environment. Commonly used input devices include, but are not limited to, joysticks, force balls/tracking balls, controller wands, data gloves, trackpads, on-device control buttons, motion trackers, bodysuits, treadmills, motion platforms, and/or the like.

Next, the system may be configured to electronically receive the at least one of the one or more input signals from the user, via the application or one or more input devices operatively connected to the virtual reality device, to interact with at least the portion of the one or more graphical components of the electronic representation of the one or more resources. In response, the system may be configured to initiate the transfer of at least the portion of the one or more graphical components of the electronic representation of the one or more resources from the virtual representation of the resource database to the virtual representation of the first entity within the virtual representation of the technology environment, wherein initiating further comprises initiating the transfer of the one or more resources to the first entity. In some embodiments, the system may be configured to initiate the transfer of at least the portion of the one or more graphical components of the electronic representation of the one or more resources to the first entity based on at least one of the one or more input signals from the user in real-time or near real-time. In some embodiments, the system may be configured to execute the transfer of the one or more resources from the resource database to the first entity based on at least transferring at least the portion of the one or more graphical components of the electronic representation of the one or more resources to the first entity in real-time or near-real time.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for dynamic transformation of electronic representation of resources, the system comprising:
   at least one non-transitory storage device; and
   at least one processing device coupled to the at least one non-transitory storage device, wherein the at least one processing device is configured to:
      electronically receive, via an application stored on a computing device of a user, a request from a user to access one or more resources, wherein the one or more resources are associated with the user;
      electronically receive information associated with the one or more resources associated with the user from a resource database;
      generate an electronic representation of the one or more resources;
      transmit control signals configured to cause the application stored on the computing device associated with the user to display the electronic representation of the one or more resources;
      electronically receive one or more input signals from the user, via the application, to interact with the electronic representation of the one or more resources;
      initiate an execution of one or more actions on the electronic representation of the one or more resources in response to the one or more input signals from the user;
      generate a virtual representation of the resource database and a virtual representation of a first entity in a virtual representation of a technology environment;
      electronically receive the at least one of the one or more input signals from the user, via the application, to interact with at least a portion of one or more graphical components of the electronic representation of the one or more resources; and
      initiate a transfer of at least the portion of the one or more graphical components of the electronic representation of the one or more resources from the virtual representation of the resource database to the virtual representation of the first entity within the virtual representation of the technology environment, wherein initiating further comprises initiating the transfer of the one or more resources to the first entity.

2. The system of claim 1, wherein the at least one processing device is further configured to:
   electronically receive the one or more input signals from the user, wherein the one or more input signals comprises a request to initiate a computer-generated perceptual display of the electronic representation of the one or more resources; and
   initiate an augmented reality engine configured to cause the application to superimpose the electronic representation of the one or more resources onto one or more real-world objects.

3. The system of claim 2, wherein the augmented reality engine is further configured to:
   initiate an image capturing device associated with the computing device of the user;
   retrieve, via the image capturing device, the one or more real-world objects; and
   superimpose the electronic representation of the one or more resources onto the one or more real-world objects.

4. The system of claim 3, wherein the at least one processing device is further configured to:
   electronically receive, from the computing device of the user, control signals configured to initiate a transfer of the one or more resources to the first entity;
   generate the one or more graphical components of the electronic representation of the one or more resources based on at least receiving the control signals configured to initiate the transfer of the one or more resources; and
   transmit control signals configured to cause the computing device of the user to display the one or more graphical components of the electronic representation of the one or more resources.

5. The system of claim 4, wherein the at least one processing device is further configured to:
   electronically receive at least one of the one or more input signals from the user, via the application, to interact with at least a portion of the one or more graphical components of the electronic representation of the one or more resources; and
   initiate a transfer of at least the portion of the one or more graphical components of the electronic representation of the one or more resources to the first entity in response to the at least one of the one or more input signals from the user, wherein initiating further comprises initiating the transfer of the one or more resources to the first entity.

6. The system of claim 5, wherein the at least one processing device is further configured to:
   transmit control signals configured to cause the computing device of the user to display the virtual representation of the resource database and the virtual representation of the first entity within the technology environment.

7. The system of claim 6, wherein the at least one processing device is further configured to:
   initiate the transfer of at least the portion of the one or more graphical components of the electronic representation of the one or more resources to the first entity based on at least one of the one or more input signals from the user in real-time or near real-time.

8. The system of claim 7, wherein the at least one processing device is further configured to:
   execute the transfer of the one or more resources from the resource database to the first entity based on at least transferring at least the portion of the one or more graphical components of the electronic representation of the one or more resources to the first entity in real-time or near-real time.

9. A computerized implemented method for dynamic transformation of electronic representation of resources, the method comprising:
  electronically receiving, via an application stored on a computing device of a user, a request from a user to access one or more resources, wherein the one or more resources are associated with the user;
  electronically receiving information associated with the one or more resources associated with the user from a resource database;
  generating an electronic representation of the one or more resources;
  transmitting control signals configured to cause the application stored on the computing device associated with the user to display the electronic representation of the one or more resources;
  electronically receiving one or more input signals from the user, via the application, to interact with the electronic representation of the one or more resources;
  initiating an execution of one or more actions on the electronic representation of the one or more resources in response to the one or more input signals from the user;
  generating a virtual representation of the resource database and a virtual representation of a first entity in a virtual representation of a technology environment electronically receiving the at least one of the one or more input signals from the user, via the application, to interact with at least a portion of one or more graphical components of the electronic representation of the one or more resources; and
  initiating a transfer of at least the portion of the one or more graphical components of the electronic representation of the one or more resources from the virtual representation of the resource database to the virtual representation of the first entity within the virtual representation of the technology environment, wherein initiating further comprises initiating the transfer of the one or more resources to the first entity.

10. The method of claim 9, wherein the method further comprises:
  electronically receiving the one or more input signals from the user, wherein the one or more input signals comprises a request to initiate a computer-generated perceptual display of the electronic representation of the one or more resources; and
  initiating an augmented reality engine configured to cause the application to superimpose the electronic representation of the one or more resources onto one or more real-world objects.

11. The method of claim 10, wherein the augmented reality engine is further configured to:
  initiate an image capturing device associated with the computing device of the user; and
  retrieve, via the image capturing device, the one or more real-world objects; and
  superimpose the electronic representation of the one or more resources onto the one or more real-world objects.

12. The method of claim 11, wherein the method further comprises:
  electronically receiving, from the computing device of the user, control signals configured to initiate a transfer of the one or more resources to the first entity;
  generating one or more graphical components of the electronic representation of the one or more resources based on at least receiving the control signals configured to initiate the transfer of the one or more resources; and
  transmitting control signals configured to cause the computing device of the user to display the one or more graphical components of the electronic representation of the one or more resources.

13. The method of claim 12, wherein the method further comprises:
  electronically receiving at least one of the one or more input signals from the user, via the application, to interact with at least a portion of the one or more graphical components of the electronic representation of the one or more resources; and
  initiating a transfer of at least the portion of the one or more graphical components of the electronic representation of the one or more resources to the first entity in response to the at least one of the one or more input signals from the user, wherein initiating further comprises initiating the transfer of the one or more resources to the first entity.

14. The method of claim 13, wherein the method further comprises:
  transmitting control signals configured to cause the computing device of the user, the virtual representation of the resource database and the virtual representation of the first entity within the technology environment.

15. The method of claim 14, wherein the method further comprises:
  initiating the transfer of at least the portion of the one or more graphical components of the electronic representation of the one or more resources to the first entity based on at least one of the one or more input signals from the user in real-time or near real-time.

16. The method of claim 15, wherein the method further comprises:
  executing the transfer of the one or more resources from the resource database to the first entity based on at least transferring at least the portion of the one or more graphical components of the electronic representation of the one or more resources to the first entity in real-time or near-real time.

17. A computer program product on a non-transitory computer-readable medium for dynamic transformation of electronic representation of resources, the computer program product comprising code causing a first apparatus to:
  electronically receive, via an application stored on a computing device of a user, a request from a user to access one or more resources, wherein the one or more resources are associated with the user;
  electronically receive information associated with the one or more resources associated with the user from a resource database;
  generate an electronic representation of the one or more resources;
  transmit control signals configured to cause the application stored on the computing device associated with the user to display the electronic representation of the one or more resources;
  electronically receive one or more input signals from the user, via the application, to interact with the electronic representation of the one or more resources;
  initiate an execution of one or more actions on the electronic representation of the one or more resources in response to the one or more input signals from the user;

generate a virtual representation of the resource database and a virtual representation of a first entity in a virtual representation of a technology environment;

electronically receive the at least one of the one or more input signals from the user, via the application, to interact with at least a portion of one or more graphical components of the electronic representation of the one or more resources; and initiate a transfer of at least the portion of the one or more graphical components of the electronic representation of the one or more resources from the virtual representation of the resource database to the virtual representation of the first entity within the virtual representation of the technology environment, wherein initiating further comprises initiating the transfer of the one or more resources to the first entity.

18. The computer program product on a non-transitory computer-readable medium of claim 17, wherein the first apparatus is further configured to:

electronically receive the one or more input signals from the user, wherein the one or more input signals comprises a request to initiate a computer-generated perceptual display of the electronic representation of the one or more resources; and initiate an augmented reality engine configured to cause the application to superimpose the electronic representation of the one or more resources onto one or more real-world objects.

19. The computer program product on a non-transitory computer-readable medium of claim 18, wherein the augmented reality engine is further configured to:

initiate an image capturing device associated with the computing device of the user;

retrieve, via the image capturing device, the one or more real-world objects; and superimpose the electronic representation of the one or more resources onto the one or more real-world objects.

20. The computer program product on a non-transitory computer-readable medium of claim 19, wherein the first apparatus is further configured to:

electronically receive, from the computing device of the user, control signals configured to initiate a transfer of the one or more resources to the first entity;

generate one or more graphical components of the electronic representation of the one or more resources based on at least receiving the control signals configured to initiate the transfer of the one or more resources; and transmit control signals configured to cause the computing device of the user to display the one or more graphical components of the electronic representation of the one or more resources.

\* \* \* \* \*